United States Patent
Iwakawa

(10) Patent No.: US 8,297,505 B2
(45) Date of Patent: Oct. 30, 2012

(54) PRODUCT MANAGEMENT APPARATUS, PRODUCT MANAGEMENT METHOD, AND STORAGE MEDIUM STORING PRODUCT MANAGEMENT PROGRAM

(75) Inventor: Akinori Iwakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 264 days.

(21) Appl. No.: 12/801,374

(22) Filed: Jun. 4, 2010

(65) Prior Publication Data
US 2010/0327052 A1 Dec. 30, 2010

(30) Foreign Application Priority Data
Jun. 26, 2009 (JP) .................... 2009-152791

(51) Int. Cl.
*G06F 19/00* (2006.01)
(52) U.S. Cl. .............. 235/385; 235/375; 235/435
(58) Field of Classification Search .............. 235/375, 235/385, 435, 451, 487, 492
See application file for complete search history.

(56) References Cited

U.S. PATENT DOCUMENTS
7,489,246 B2 * 2/2009 Himberger et al. ........ 340/572.1
2006/0006987 A1 * 1/2006 Hashimoto et al. ........ 340/10.51
2006/0293977 A1 * 12/2006 Stevens et al. ................. 705/28

FOREIGN PATENT DOCUMENTS
| JP | 2004-315154 | 11/2004 |
| JP | 2005-228268 | 8/2005 |
| JP | 2005-314073 | 11/2005 |

* cited by examiner

*Primary Examiner* — Thien M Le
*Assistant Examiner* — Christle Marshall
(74) *Attorney, Agent, or Firm* — Staas & Halsey LLP

(57) ABSTRACT

A product management apparatus includes a tag information receiver that receives first tag information identifying a first wireless tag attached to a first product, and second tag information identifying a second wireless tag attached to a second product, a group determiner that determines whether a sensor related to the received first tag information is present, a group generator that generates group information including the first tag information and the second tag information and if a difference between the time of reception of the first tag information and the time of reception of the second tag information falls within a specific range, a sensor information receiver that retrieves environment information of an environment surrounding the sensor and a product management unit that associates the retrieved environment information with the first tag information and the second tag information, included in the group information.

20 Claims, 17 Drawing Sheets

FIG.3A

| TAG ID | GATE PASS TIME |
|---|---|
| A | 20:44:00.000 |
| B | 20:44:00.001 |
| C | 20:44:00.002 |
| D | 20:44:00.003 |
| E | 20:44:00.004 |

FIG.3B

| TAG ID | SENSOR ID |
|---|---|
| E | X1 |

FIG.3C

| SENSOR ID | DETECTED TEMPERATURE |
|---|---|
| X1 | 5°C |

FIG.3D

| G-ID | SENSOR ID | TAG ID | | | | |
|---|---|---|---|---|---|---|
| 001 | X1 | A | B | C | D | E |
| TIME AND DATE OF GENERATION | | EXPIRATION DATE | | | | |
| 09/01/01-10:10:10 | | 09/01/02-10:10:10 | | | | |

FIG.4A

| TAG ID | STATUS | TEMPERATURE |
|--------|--------|-------------|
| A | IN TRANSPORTATION | N/A |
| B | IN TRANSPORTATION | N/A |
| C | IN TRANSPORTATION | N/A |
| D | IN TRANSPORTATION | N/A |
| E | IN TRANSPORTATION | 8°C |

FIG.4B

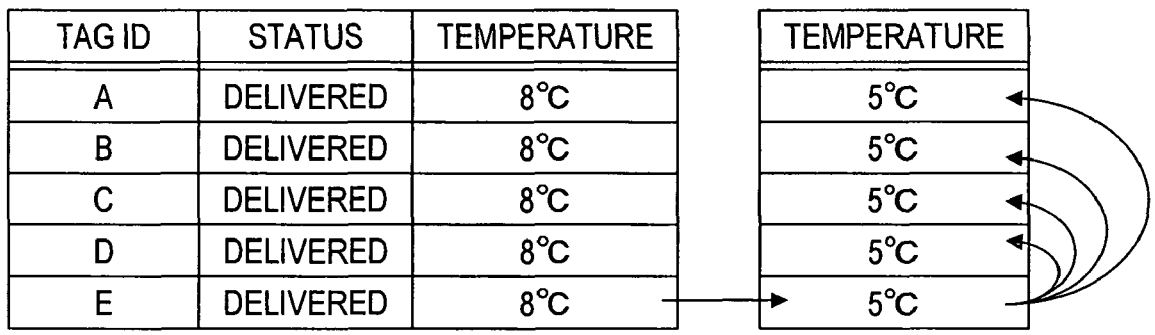

| TAG ID | STATUS | TEMPERATURE | | TEMPERATURE |
|--------|--------|-------------|---|-------------|
| A | DELIVERED | 8°C | | 5°C |
| B | DELIVERED | 8°C | | 5°C |
| C | DELIVERED | 8°C | | 5°C |
| D | DELIVERED | 8°C | | 5°C |
| E | DELIVERED | 8°C | | 5°C |

FIG.4C

| TAG ID | STATUS | TEMPERATURE |
|--------|--------|-------------|
| A | SHIPPED | N/A |
| B | SHIPPED | N/A |
| C | RECEIVED | 5°C |
| D | RECEIVED | 5°C |
| E | RECEIVED | 5°C |

FIG.9A

| TAG ID | SENSOR ID | |
|---|---|---|
| B | X2 | MAIN SENSOR |
| E | X3 | SUB-SENSOR |

FIG.9B

| G-ID | SENSOR ID | | TAG ID | | | | |
|---|---|---|---|---|---|---|---|
| 001 | X2 | X3 | A | B | C | D | E |
| TIME AND DATE OF GENERATION | | | EXPIRATION DATE | | | | |
| 09/01/01-10:10:10 | | | 09/01/02-10:10:10 | | | | |

FIG.15A

| TAG ID | STATUS | TEMPERATURE |
|---|---|---|
| A | IN TRANSPORTATION | N/A |
| B | IN TRANSPORTATION | N/A |
| C | IN TRANSPORTATION | N/A |
| D | IN TRANSPORTATION | N/A |
| E | IN TRANSPORTATION | N/A |

FIG.15B

| TAG ID | STATUS | TEMPERATURE | TEMPERATURE |
|---|---|---|---|
| A | RECEIVED | 8°C | 5°C |
| B | RECEIVED | 8°C | 5°C |
| C | RECEIVED | 8°C | 5°C |
| D | RECEIVED | 8°C | 5°C |
| E | RECEIVED | 8°C | 5°C |

FIG.15C

| TAG ID | STATUS | TEMPERATURE | TEMPERATURE | TEMPERATURE |
|---|---|---|---|---|
| A | SHIPPED | 8°C | 5°C | N/A |
| B | SHIPPED | 8°C | 5°C | N/A |
| C | CONVEYED IN | 8°C | 5°C | 5°C |
| D | CONVEYED IN | 8°C | 5°C | 5°C |
| E | CONVEYED IN | 8°C | 5°C | 5°C |

PRODUCT MANAGEMENT APPARATUS, PRODUCT MANAGEMENT METHOD, AND STORAGE MEDIUM STORING PRODUCT MANAGEMENT PROGRAM

CROSS-REFERENCE TO RELATED APPLICATIONS

This application is based upon and claims the benefit of priority of the prior Japanese Patent Application No. 2009-152791, filed on Jun. 26, 2009, the entire contents of which are incorporated herein by reference.

FIELD

Various embodiments described herein relate to a product management apparatus, a product management method, and a storage medium storing a product management program for managing products using a wireless tag.

BACKGROUND

Inventory management or delivery management of products are performed by attaching a wireless tag and a sensor onto products. The wireless tags include an integrated circuit (IC) tag, a radio frequency identification (RFID) tag, etc. The wireless tag typically stores an ID (identification) of each product. The sensor is a temperature sensor or a global positioning system (GPS) sensor, for example. By monitoring the wireless tag and the sensor, the type of a product and environment information (temperature information, position information or the like) may be retrieved. With the wireless tag and the temperature sensor, the time for the management of products is saved, and human errors in the management are prevented.

For example, Japanese Unexamined Patent Application Publication No. 2004-315154 discusses a technique for managing a product using a wireless tag. In accordance with Japanese Unexamined Patent Application Publication No. 2004-315154, a temperature sensor, or a temperature sensor and a shock sensor are attached to a packaging container to make sure that the product has not suffered from extremes of temperature change or shock. Japanese Unexamined Patent Application Publication No. 2005-314073 discusses a product management technique in which a temperature sensor is attached to each product and a container holding the product. Japanese Unexamined Patent Application Publication No. 2005-228268 discusses another product management technique in which information read from a wireless tag and a sensor is successively stored such that an amount of data of the stored data is prevented from becoming too large.

SUMMARY

A product management apparatus includes a tag information receiver receives first tag information identifying a first wireless tag attached to a first product, and second tag information identifying a second wireless tag attached to a second product, a group determiner determines whether a sensor related to the received first tag information is present, a group generator generates group information including the first tag information and the second tag information if the group determiner determines that the sensor is present and if a difference between the time of reception of the first tag information by the tag information receiver and the time of reception of the second tag information by the tag information receiver falls within a specific range, a sensor information receiver retrieves environment information of an environment surrounding the sensor detected by the sensor and a product management unit associates the retrieved environment information with the first tag information and the second tag information, included in the group information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A illustrates a time management table.

FIG. 3B illustrates a sensor mapping table.

FIG. 3C illustrates a detection result storage table.

FIG. 3D illustrates a grouping table.

FIGS. 4A-4C illustrate product information management tables related to products.

FIG. 9A illustrates a sensor mapping table.

FIG. 9B illustrates a grouping table.

FIGS. 15A-15C illustrate product information management tables.

DESCRIPTION OF EMBODIMENTS

Attaching sensors to all the products to be managed increases costs. A single sensor may be statically assigned to a plurality of products. If the sensor comes off in transportation, environment information of the products may not be retrieved. Management of the products becomes complicated.

Various embodiments described below propose a product management apparatus, a product management method, and a storage medium storing a product management program for controlling cost increase and management complexity.

Product management apparatuses of preferred embodiments are described with reference to the drawings. The product management apparatus of the embodiments is used in a product management system for monitoring product quality, position information, etc.

Figure 1:
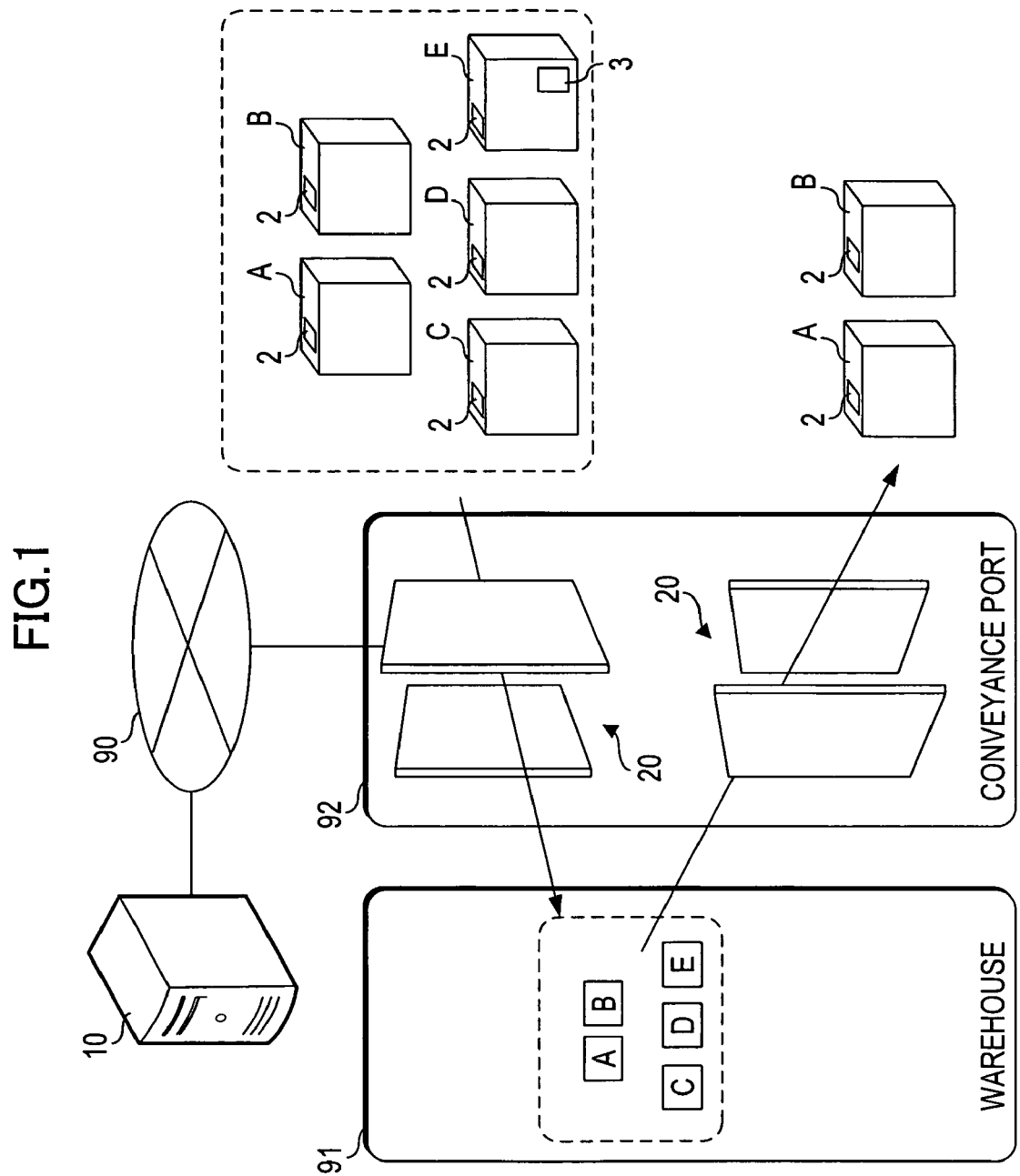
FIG. 1 diagrammatically illustrates a product management system of a first embodiment.

FIG. 1 diagrammatically illustrates a product management system of a first embodiment.

The product management system of the first embodiment manages quality of fresh food by monitoring the temperature of the fresh food stored in a warehouse 91. The product management system includes a reader gate 20 installed at a conveyance port 92 of the warehouse 91, and a server 10. The server 10 is a product management apparatus in the embodiment. The server 10 is connected to the reader gate 20 via a communication network 90. The communication network 90 is one of a local-area network (LAN) and a wide-area network (WAN), for example. The communication network 90 may be one of a wired network or a wireless network.

In accordance with the first embodiment, a block of fresh food, each block including a plurality of food units, is loaded on a carriage or the like and then conveyed into the warehouse 91 via the reader gate 20. The fresh food is hereinafter referred to as a product. The block is hereinafter referred to as a conveyance block. After a storage period in the warehouse 91, a needed number of products of the conveyance block are conveyed out of the warehouse 91 via the reader gate 20. In the discussion that follows, products A, B, C, D, and E are conveyed into the warehouse 91 and products A and B are then conveyed out of the warehouse 91.

The products A, B, C, D, and E are respectively tagged with wireless tags 2. The wireless tag 2 is an IC tag, an RFID tag, or the like. The wireless tag 2 pre-stores a tag ID on a re-writable storage area thereof. Tag ID is referred to tag information. The wireless tag 2 may store time and date of manufacture and expiration date of the product in addition to the tag ID.

A temperature sensor is attached to the product E. The temperature sensor 3 detects periodically a temperature of the product E or a temperature of a surrounding environment of the product E, or the like. The temperature of the product E corresponds to the environment information. The temperature sensor 3 includes a wireless communication function. The temperature sensor 3 transmits the periodically detected temperature to the server 10 via the communication network 90. The periodically detected temperature is referred to a detected temperature. When the detected temperature is transmitted, the temperature sensor 3 transmits a sensor ID together with the temperature to identify the temperature sensor 3. It is sufficient if the temperature sensor 3 is attached at least one of the products contained in the conveyance block.

When the products A, B, C, D, and E having the wireless tags 2 attached thereon pass through the reader gate 20, the reader gate 20 exchanges data with each wireless tag 2. The reader gate 20 reads the tag ID. The reader gate 20 transmits the read tag ID to the server 10.

The server 10 receives the tag ID from the reader gate 20. The server 10 stores on a storage unit thereof the received tag ID. In response to the tag ID, the server 10 identifies each of the products A, B, C, D, and E having passed through the reader gate 20. In this way, the server 10 monitors each of the products A, B, C, D, and E having passed through the reader gate 20 and having been conveyed into the warehouse 91.

The server 10 also receives the detected temperature and the sensor ID, periodically transmitted from the temperature sensor 3. In response to the received sensor ID, the server 10 identifies the product E having the temperature sensor 3 having transmitted the detected temperature. The server 10 then monitors the received detected temperature as the temperature of the product E for quality.

The server 10 groups a plurality of products passing through the reader gate 20. In accordance with the first embodiment, the products A, B, C, D, and E are conveyed in a conveyance block on a carriage or the like, and pass through the reader gate 20 at substantially the same time. The phrase "substantially the same time" refers to within a specific time period. For example, the specific time period is 10 seconds. What is meant by the products A, B, C, D, and E passing through the reader gate 20 at substantially the same time is that the products A, B, C, D, and E pass through the reader gate 20 within the specific time period. The server 10 groups the products A, B, C, D, and E having passed through the reader gate 20 at substantially the same time into the same group. The server 10 then causes the remaining products A, B, C, and D within the same group of the product E to reflect the detected temperature received from the temperature sensor 3. This arrangement eliminates the need for attaching the temperature sensors 3 to all the products to be conveyed into the warehouse 91.

Alternatively, the product management system may convey the products A, B, C, D, and E on a belt conveyer or the like. In such a case, if the products A, B, C, D, and E successively pass through the reader gate 20 within the specific period of time, the server 10 groups the products A, B, C, D, and E into the same group.

Figure 2:
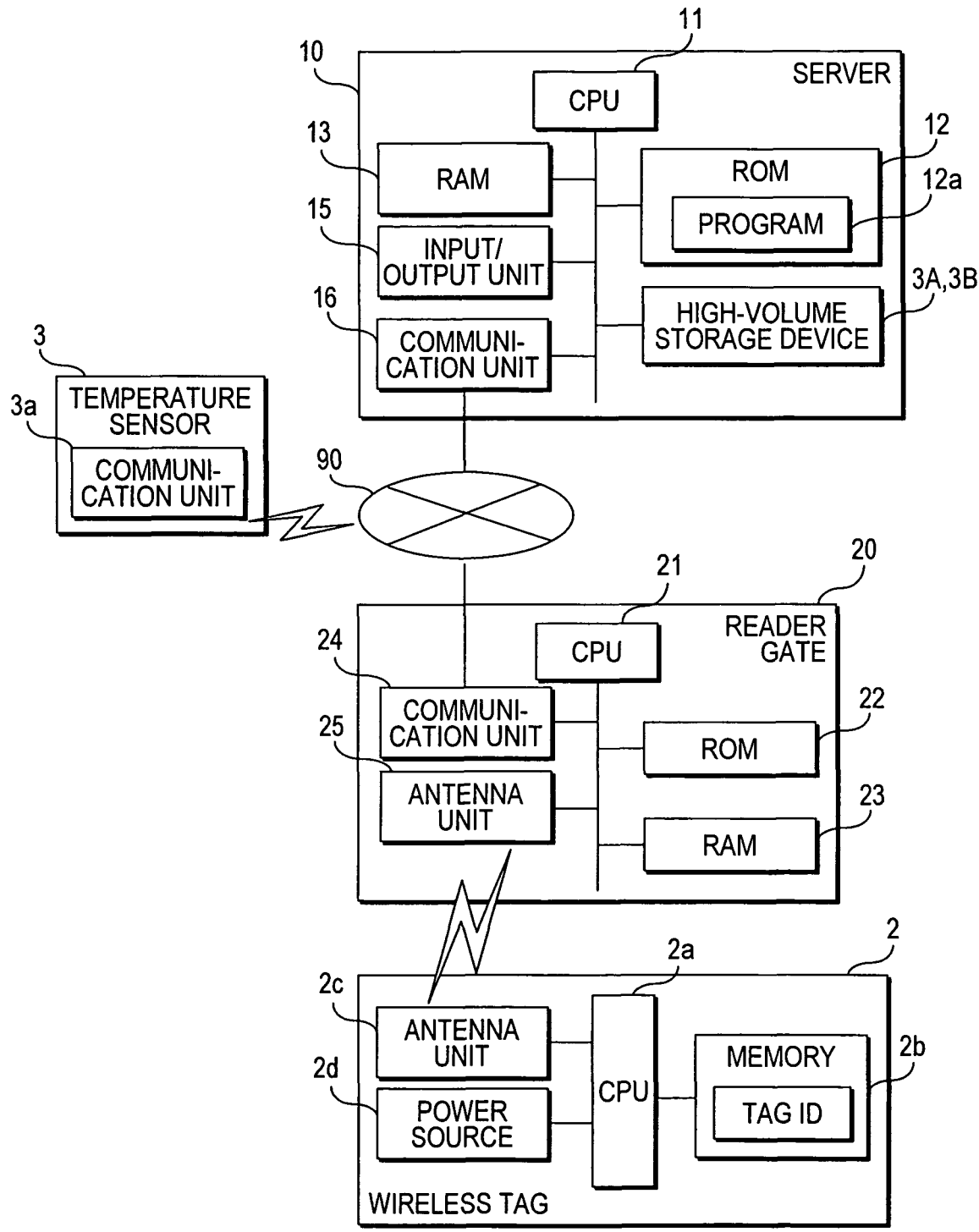
FIG. 2 is a block diagram illustrating a structure of the product management system of the first embodiment.

A structure and operation of the product management system of the first embodiment are described below. FIG. 2 is a block diagram illustrating the structure of the product management system of the first embodiment.

The server 10 includes, as hardware elements, a central processing unit (CPU) 11, a read-only memory (ROM) 12, a random-access memory (RAM) 13, a high-volume storage device 14, an input/output unit 15, a communication unit 16, etc. These hardware elements are interconnected to each other via a bus.

The CPU 11 reads a program pre-stored on the ROM 12, the high-volume storage device 14, or the like onto the RAM 13 as appropriate for execution. The CPU 11 controls operation of each of the above-described hardware elements. The ROM 12 pre-stores a program 12a for causing the server 10 to operate as a product management apparatus. The RAM 13 may be a static RAM (SRAM), a dynamic RAM (DRAM), a flash memory, or the like. The RAM 13 temporarily stores a variety of data created when the CPU 11 executes the program.

The high-volume storage device 14 is a hard disk drive (HDD). The high-volume storage device 14 stores the program to be read and executed by the CPU 11, a data table created in the process of the program, and a pre-registered data table, etc. The data table is used to manage the products. More specifically, the data table stores the tag ID of the wireless tag 2, the detection results of the temperature sensor 3, etc.

The input/output unit 15 receives an operational input from the server 10 while displaying process results. The input/output unit 15 may include a keyboard, a mouse, a loudspeaker, a monitor, etc. The communication unit 16 performs data communications via the communication network 90. The temperature sensor 3 includes a communication unit 3a. The temperature sensor 3 transmits periodically the detected temperature and the sensor ID identifying the temperature sensor 3. The server 10 receives the detected results and the sensor ID of the temperature sensor 3 via the communication network 90. The server 10 receives from the reader gate 20 the tag ID of the wireless tag 2 read by the reader gate 20.

The reader gate 20 includes, as hardware elements, a CPU 21, a ROM 22, a RAM 23, a communication unit 24, an antenna unit 25, etc. These hardware elements are interconnected to each other via a bus.

The CPU 21 reads a program pre-stored on the ROM 22 onto the RAM 23 as appropriate for execution. The CPU 21 controls each of the above-described hardware elements. The ROM 22 pre-stores the necessary program. The RAM 23 may be an SRAM, a DRAM, a flash memory, or the like. The RAM 23 temporarily stores a variety of data created when the CPU 21 executes the program.

The communication unit 24 exchanges data with the server 10 via the communication network 90. The antenna unit 25 transmits a signal to and receives a signal from the wireless tag 2 in the vicinity of the reader gate 20. For example, the antenna unit 25 transmits periodically a signal requesting the wireless tag 2 to transmit the tag ID. The signal requesting the transmission of the tag ID is hereinafter referred to as a requesting signal. When a product having the wireless tag 2 attached thereon passes through the reader gate 20, the wireless tag 2 receives the requesting signal. The wireless tag 2 transmits a signal including the stored tag ID. The signal the wireless tag 2 transmits in response to the requesting signal is hereinafter referred to as a response signal. The antenna unit 25 receives the response signal from the wireless tag 2. The response signal received by the antenna unit 25 is demodulated and the tag ID included in the response signal is transmitted to the server 10.

The wireless tag 2 includes a CPU 2a, a memory 2b, an antenna unit 2c, a power source 2d, etc. The memory 2b is an electronically erasable and programmable ROM (EPROM), a flash ROM, or the like. The memory 2b stores the tag ID. The antenna unit 2c transmits a signal to and receives a signal from the reader gate 20. When the antenna unit 2c receives the requesting signal, the CPU 2a issues the response signal. A distance over which the antenna unit 2c may receive from the requesting signal from the reader gate 20 is determined depending on a frequency on which the requesting signal is transmitted. The power source 2d powers each element. With the power source 2d included, the wireless tag 2 transmits a low-intensity signal therefrom. The wireless tag 2 may be of a passive type.

A variety of data tables stored on the high-volume storage device 14 of the server 10 are described below.

FIG. 3A illustrates a time management table. The time management table is generated or updated when the server 10 receives a tag ID. The time management table stores a tag ID received from the reader gate 20 by the server 10 and reception time of the tag ID in a mapped state with the tag ID mapped to the reception time. By referencing the time management table, the server 10 may manage a product conveyed into or out of the warehouse 91 through the reader gate 20. In the discussion that follows, the tag ID matches a code of a product having the wireless tag 2 attached thereto. For example, the tag ID of the wireless tag 2 attached to the product A is "A."

FIG. 3B illustrates a sensor mapping table. The sensor mapping table is pre-stored on the high-volume storage device 14. The sensor mapping table stores the tag ID of the wireless tag 2 and a sensor ID of the temperature sensor 3 in a mapped state with the tag ID mapped to the sensor ID. Upon receiving the tag ID, the server 10 references the sensor mapping table. The server 10 determines whether the wireless tag 2 responsive to the received tag ID is mapped to the temperature sensor 3. More specifically, the server 10 determines whether the temperature sensor 3 is attached to the product corresponding to the received tag ID. In accordance with the first embodiment, the sensor ID of the temperature sensor 3 attached to the product E is "X1."

FIG. 3C illustrates a detection result storage table. The detection result storage table stores the sensor ID of the temperature sensor 3 and the temperature detected by the temperature sensor 3 in a mapped state with the sensor ID mapped to the temperature. The detection result storage table is updated each time the detected temperature is received from the temperature sensor 3. In this case, a new detected temperature may overwrite the old detected temperature. Alternatively, the received detected temperatures may be stored as a history.

FIG. 3D illustrates a grouping table. The grouping table is generated when a plurality of products are grouped. The grouping table stores the sensor ID of the temperature sensor 3, and the tag ID of the wireless tag 2 attached to each of the products in the conveyance block in a mapped state with the sensor ID mapped to the tag ID. Referring to FIG. 3D, the grouping table stores the tag ID of the wireless tag E having the temperature sensor 3. The grouping table further stores the tag IDs of wireless tags 2 respectively attached to the products A, B, C, and D having passed at substantially the same time. Information including tag IDs "A," "B," "C" and "D" of the wireless tags 2 respectively attached to the products A, B, C, and D having passed through the reader gate 20 at substantially the same time are referred to as group information.

The grouping table further stores the sensor ID "X1" of the temperature sensor 3 corresponding to the tag ID "E" of the product E having passed through the reader gate 20. The sensor ID corresponding to the tag ID is retrieved from the sensor mapping table. The grouping table may also store a grouping ID (G-ID), time and date of generation on which the table was generated, and expiration date.

The server 10 causes the products of the same group to reflect the detected results of the temperature sensor 3, using the grouping table. Referring to FIG. 3D, for example, the server 10 causes the temperatures of the products A, B, C, and D of the same group to reflect the temperature detected by the temperature sensor 3 of the sensor ID "X1."

FIGS. 4A-4C are product information management tables of the products. The product information management table stores the tag ID of the wireless tag 2, the transportation status of each product, and the temperature detected by the temperature sensor 3 in the mutually mapped state thereof. The product information management table is updated each time the server 10 receives the tag ID and the detected temperature of the temperature sensor 3. FIGS. 4A-4C illustrate a transition of the product information management table when the products A, B, C, D, and E are conveyed in and out.

FIG. 4A illustrates the product information management table prior to the grouping of the products A, B, C, D, and E. In the case of the product A, for example, "in transportation" is stored at the transportation status cell, and a label "N/A" is stored at the temperature cell because no temperature sensor 3 is attached. The label "N/A" represents that no temperature information is acquired. For the product E, a temperature of "8° C." detected by the temperature sensor 3 is stored at the temperature cell.

FIG. 4B illustrates the product information management table subsequent to the grouping of the products A, B, C, D, and E. As described previously, the server 10 generates the grouping table illustrated in FIG. 3D. The server 10 updates the product information management table based on the grouping table. For example, the products A, B, C, and D with no temperature sensor 3 attached thereto are set to be in the same group as that of the product E having the temperature sensor 3 corresponding to the sensor ID "X1." The products A, B, C, and D reflect a temperature of "8° C." of the product E. If the temperature of the product E detected by the temperature sensor 3 has changed from "8° C." to "5° C.," the server 10 changes the temperature of the products A, B, C, and D to "5° C.," accordingly.

FIG. 4C illustrates the product information management table with the products A and B delisted from the grouping. For example, when the products A and B are conveyed out, the server 10 receives the tag IDs of the products A and B. If the products A and B are grouped, the server 10 cancels the grouping of the products A and B. As a result, the products A and B do not reflect the temperature of the product E anymore. The label "N/A" is stored at each of the temperature cells of the products A and B in the product information management table.

As described above, the server 10 successively updates the product information management table based on the grouping table. The server 10 thus performs quality control in terms of transportation status and temperature of the product responsive to the received tag ID.

Figure 5:
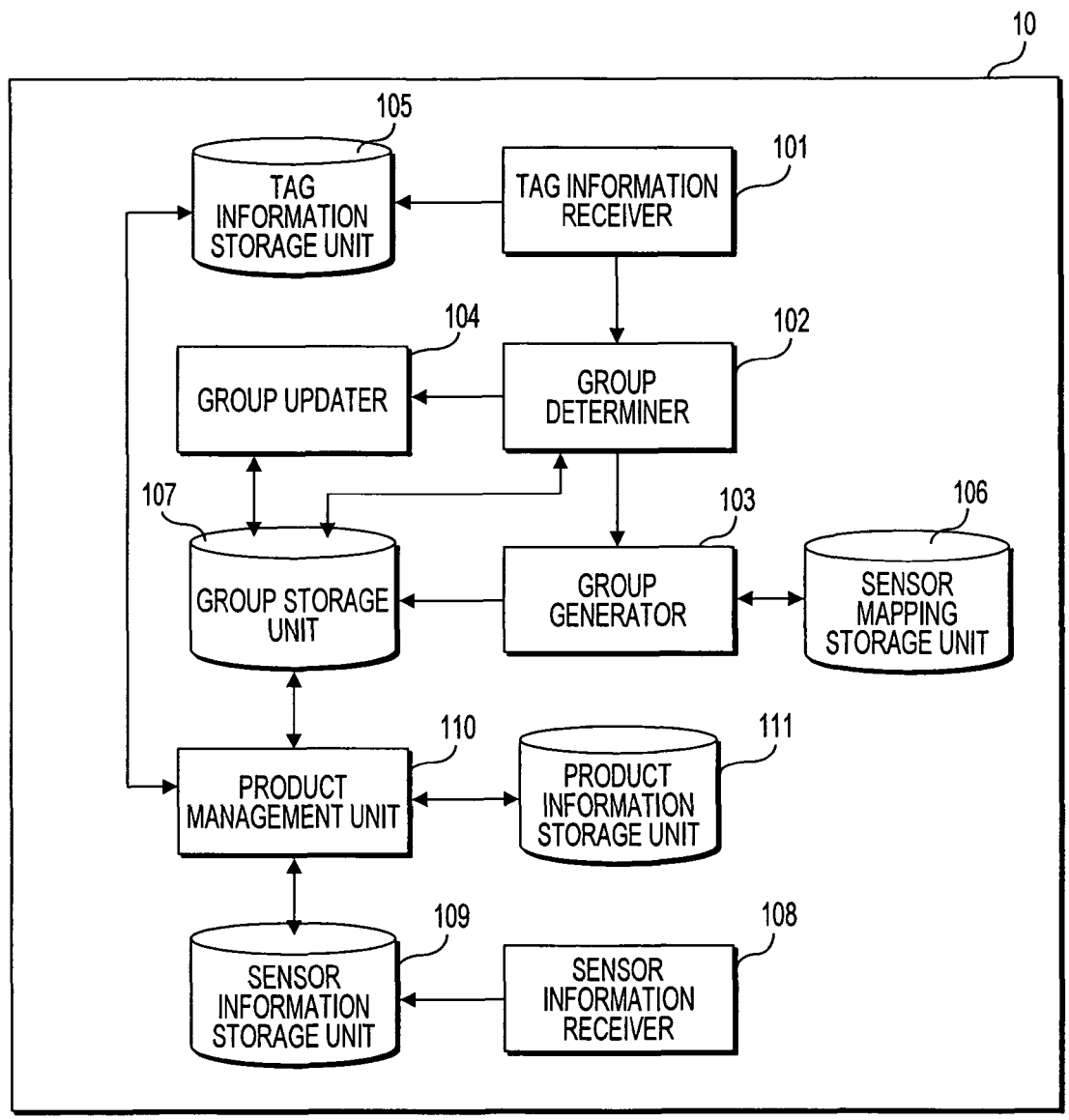
FIG. 5 is a functional block diagram illustrating a function of a server of the first embodiment.

The process of the server 10 in the product management system is described below. FIG. 5 is a functional block diagram of elements of the server 10 of the first embodiment.

The server 10 includes a tag information receiver 101, a group determiner 102, a group generator 103, a group updater 104, a tag information storage unit 105, a sensor mapping storage unit 106, and a group storage unit 107. The tag information receiver 101, the group determiner 102, the group generator 103, and the group updater 104 are implemented when the CPU in the server 10 executes the program 12a stored on the ROM 12. The tag information storage unit 105 stores the time management table. The sensor mapping storage unit 106 stores the sensor mapping table. The group storage unit 107 stores the grouping table.

The tag information receiver 101 receives from the reader gate 20 the tag ID of the wireless tag 2 received by the reader gate 20. The tag information receiver 101 stores on the tag information storage unit 105 the received tag ID and the reception time thereof with the tag ID mapped to the reception time. The tag information receiver 101 outputs the received tag ID to the group determiner 102.

The group determiner 102 determines whether the tag ID received by the tag information receiver 101 is grouped. More specifically, the group determiner 102 determines whether the grouping table storing the received tag ID is stored on the group storage unit 107. If the received tag ID is grouped, the group determiner 102 outputs the tag ID to the group updater 104. If the received tag ID is not grouped, the group determiner 102 outputs the tag ID to the group generator 103.

If the tag ID received by the tag information receiver 101 is not grouped, the group generator 103 generates a grouping table. The group generator 103 then stores the grouping table on the group storage unit 107. More specifically, the group generator 103 references the sensor mapping table stored on the sensor mapping storage unit 106, and determines whether the temperature sensor 3 corresponding to the wireless tag 2 storing the received tag ID is present or not. If the corresponding temperature sensor 3 is present, the group generator 103 references the time management table and reads a plurality of tag IDs received at substantially the same time as the tag ID of the temperature sensor 3. The group generator 103 generates a grouping table with the plurality of read tag IDs being as a single group. Even if the received tag ID is not grouped, the group generator 103 does not perform a grouping operation with no corresponding temperature sensor 3 being present. The grouping operation is performed only if the tag information receiver 101 has received the tag ID with the corresponding temperature sensor 3 being present.

If the tag ID received by the tag information receiver 101 is grouped, the group updater 104 references the grouping table. The other tag IDs included in the same group as the received tag ID are thus retrieved. Referencing the time management table or the like, the group updater 104 determines whether the tag information receiver 101 has received all the tag IDs included in the group. If all the tag IDs have been received, the grouping is not canceled. If all the tag IDs in the group are received, the group updater 104 determines that the conveyance block including all the products having the grouped wireless tags has passed through the reader gate 20. If a part of the tag IDs within the group is received, the group updater 104 cancels the grouping. In other words, the group updater 104 determines that some of the products included in the conveyance block have been picked up and passed through the reader gate 20. The cancelation of the grouping is to delete the received tag ID from the grouping table. Alternatively, the cancelation of the grouping may be to delete all the tag IDs grouped in the grouping table from the table.

If the grouped products A and B are conveyed out of the warehouse 91, the products A and B are deleted from the grouping table. As a result, the products A and B do not reflect the detected temperature of the temperature sensor 3 attached to the product E. On the other hand, the products C, D, and E continue to be stored in the same group in the warehouse 91.

The server 10 further includes processors, such as a sensor information receiver 108 and a sensor information storage unit 109. The sensor information storage unit 109 stores a detection result storage table. The sensor information receiver 108 receives the temperature detected by the temperature sensor 3 and the sensor ID, and stores the temperature and the sensor ID on the sensor information storage unit 109.

The server 10 further includes processors, such as a product management unit 110 and a production information storage unit 111. The production information storage unit 111 stores a production information management table. The product management unit 110 references the time management table stored on the tag information storage unit 105 and manages the products conveyed in and out. The product management unit 110 successively updates the product information management table based on the grouping table stored on the group storage unit 107, the detection result storage table stored on the sensor information storage unit 109, etc.

The operation of the server 10 in the above-described the product management system is described below. The CPU 11 in the server 10 executes the program 12a stored on the ROM 12 or the like, thereby functioning as each element illustrated in FIG. 5. The processors implemented by the CPU 11 thus operate as described below.

Figure 6A:
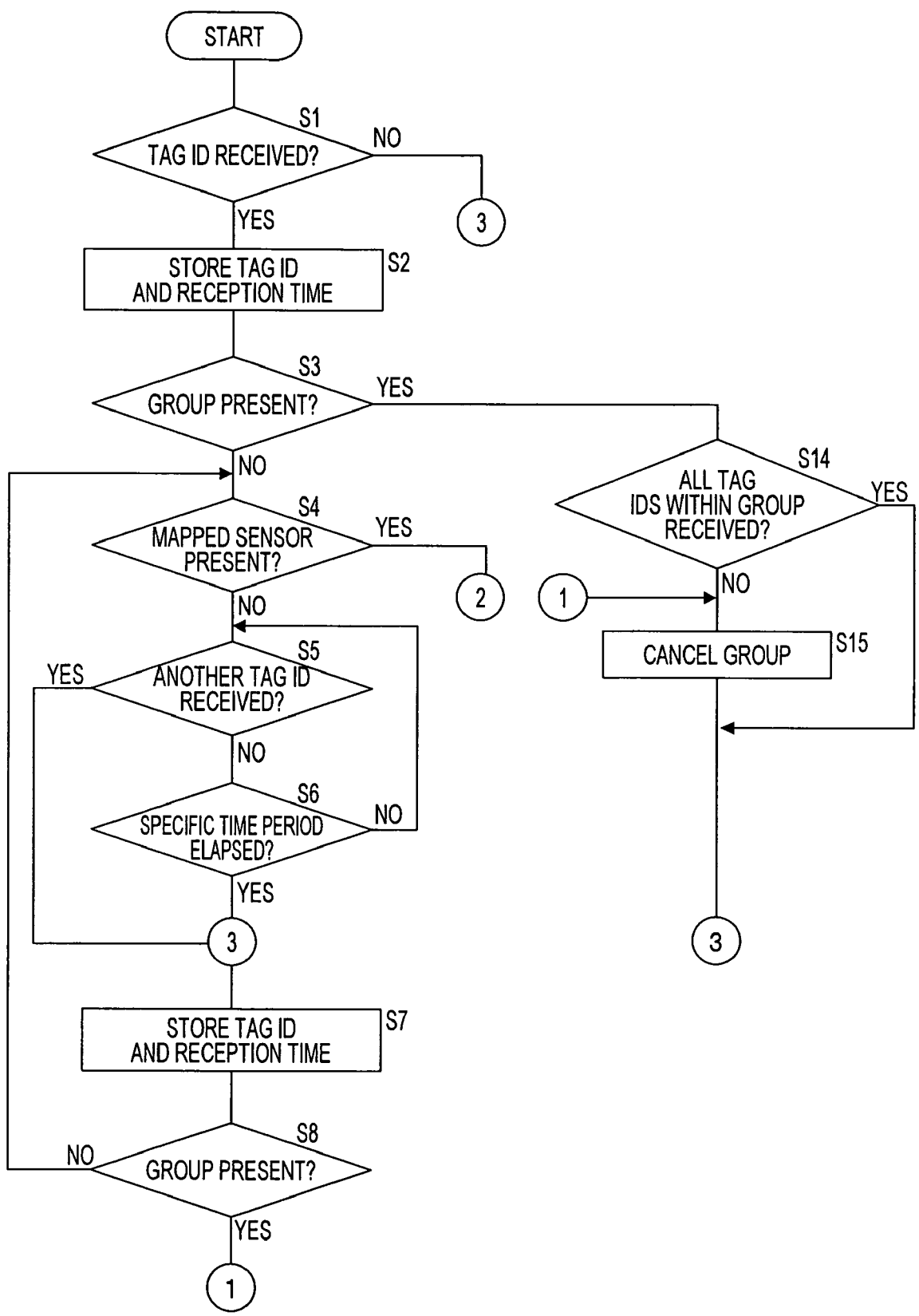
FIGS. 6A and 6B are flowcharts illustrating a reception process of the server receiving a tag ID.
Figure 6B:
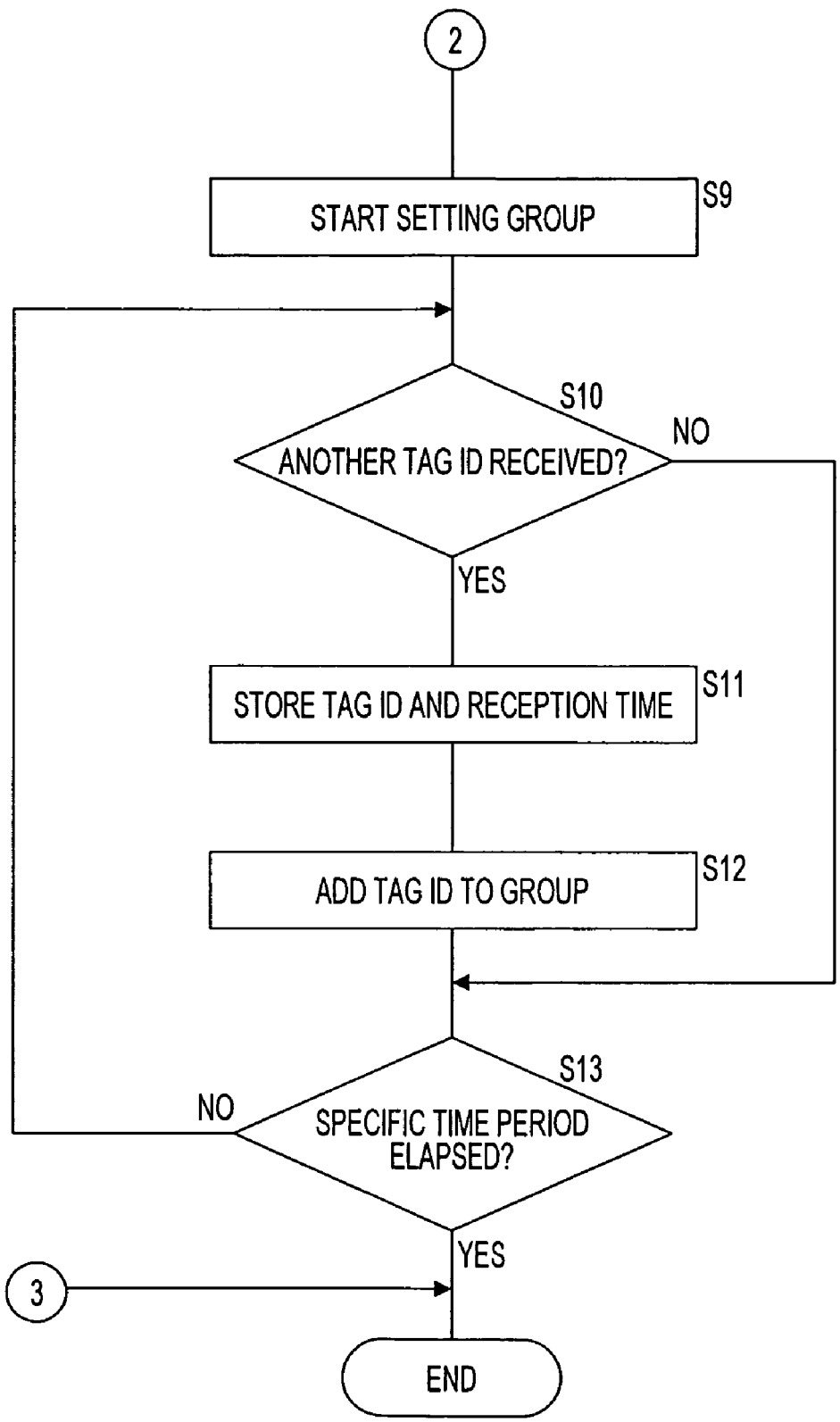

FIGS. 6A and 6B are flowcharts of a process of the server 10 performed when the server 10 receives the tag ID.

The tag information receiver 101 determines whether the reader gate 20 has received the tag ID read from the wireless tag 2 (S1). If the reader gate 20 has received no tag ID (no branch from S1), the tag information receiver 101 ends the process. If the reader gate 20 has received a tag ID (yes branch from S1), the tag information receiver 101 transmits to the tag information storage unit 105 the received tag ID and the reception time with the tag ID mapped to the reception time (S2). More specifically, the tag information storage unit 105 updates the time management table illustrated in FIG. 3A.

The group determiner 102 determines whether the received tag ID has been grouped (S3). In this case, the group determiner 102 determines whether the grouping table storing the received tag ID is stored on the group storage unit 107. If the received tag ID has not been grouped (no branch from S3), the group determiner 102 references the sensor mapping storage unit 106 to determine whether a temperature sensor 3 corresponding to the received tag ID is present or not (S4).

If there is no corresponding temperature sensor 3 (no branch from S4), the tag information receiver 101 determines whether the tag ID of another wireless tag 2 has been received from the reader gate 20 (S5). What is meant by no corresponding temperature sensor 3 in S4 is that the tag ID received in S1 is the tag ID of one of the products A, B, C, and D. If no other tag ID is received (no branch from S5), the group determiner 102 determines whether a specific period of time has elapsed since the reception of the tag ID in S1 (S6). If the specific period of time has not elapsed (no branch from S6), the group determiner 102 executes the process step in S5. If the specific period of time has elapsed (yes branch from S6), the group determiner 102 determines that a product having the temperature sensor 3 attached thereon has not passed through the reader gate 20 within the specific period of time since the first reception of the tag ID. In such a case, the group generator 103 ends the process without setting up a new group.

If the other tag ID has been received (yes branch from S5), the tag information receiver 101 stores onto the tag information storage unit 105 the received tag ID and the reception time with the tag ID mapped to the reception time (S7). The group determiner 102 determines whether the tag ID received in S5 has been grouped (S8). If the received tag ID has not been grouped (no branch from S8), the group determiner 102 executes the process step in S4. More specifically, the group determiner 102 determines whether a temperature sensor 3 corresponding to the tag ID received in S5 is present or not.

If the received tag ID has been grouped (yes branch from S8), the group determiner 102 determines that a grouped product and an ungrouped product are mixed. More specifically, a product having the tag ID received in S5 is a grouped product. A product having the tag ID received in S1 is an ungrouped product. All the products included in the conveyance block passing through the reader gate 20 must be in the same group. The mixing of grouped and ungrouped products means a conveyance anomaly. In response, the group updater 104 cancels the group set up for the tag ID received in S5 (S15). The server 10 may then issue an error alarm. The server 10 then ends the process.

If a temperature sensor 3 corresponding to the received tag ID (yes branch from S4), the group generator 103 starts setting up a new group (S9). The group generator 103 generates a grouping table. If a tag ID has been received since the start of the process, the CPU 11 adds the received tag ID to the grouping table.

The tag information receiver 101 determines whether the tag ID of the other wireless tag 2 has been received from the reader gate 20 (S10). If the tag ID has been received (yes branch from S10), the tag information receiver 101 stores onto the tag information storage unit 105 the tag ID and the reception time in a mapped state thereof (S11). The group generator 103 then adds the received tag ID to the group (S12). The group generator 103 adds the received tag ID to the grouping table generated in S9.

The tag information receiver 101 then determines whether a specific period of time has elapsed since the reception of the tag ID in S1 (S13). The specific period of time may be equal to the specific period of time in S6. If the specific period of time has not elapsed (no branch from S13), the group generator 103 repeats S10 and subsequent steps until the specific period of time has elapsed. In this way, the group generator 103 sets the tag ID of the wireless tag 2 corresponding to the temperature sensor 3 and a plurality of tag IDs received within the specific period of time in the same group. If the specific period of time has elapsed (yes branch from S13), the server 10 ends the process. If no tag ID has been received (no branch form S10), the server 10 executes the process step in S13 and subsequent steps.

If it is determined in S3 that the tag ID is grouped (yes branch from S3), the group determiner 102 determines whether all the tag IDs in the same group as that of the tag ID received in S1 have been received (S14). In other words, the group determiner 102 determines whether all the products in the same group have passed through the reader gate 20. If all the tag IDs have been received (yes branch from S14), the group determiner 102 determines that the conveyance block including the products in the same group has passed through the reader gate 20, and then ends the process.

If not all the tag IDs have been received (no branch from S14), the group determiner 102 determines that the products that have passed through the reader gate 20 are a part of the products in the same group. More specifically, the group determiner 102 determines that the grouped products A and B have been conveyed out of the warehouse 91. The group determiner 102 then excludes the received tag ID from the set group (S15). In other words, the group updater 104 deletes only the tag ID from the grouping table. The server 10 then ends the process.

In the cancellation of the group in S15, the group updater 104 may cancel all the tag IDs in the same group. In such a case, the group updater 104 deletes the corresponding grouping table from the group storage unit 107.

Figure 7:
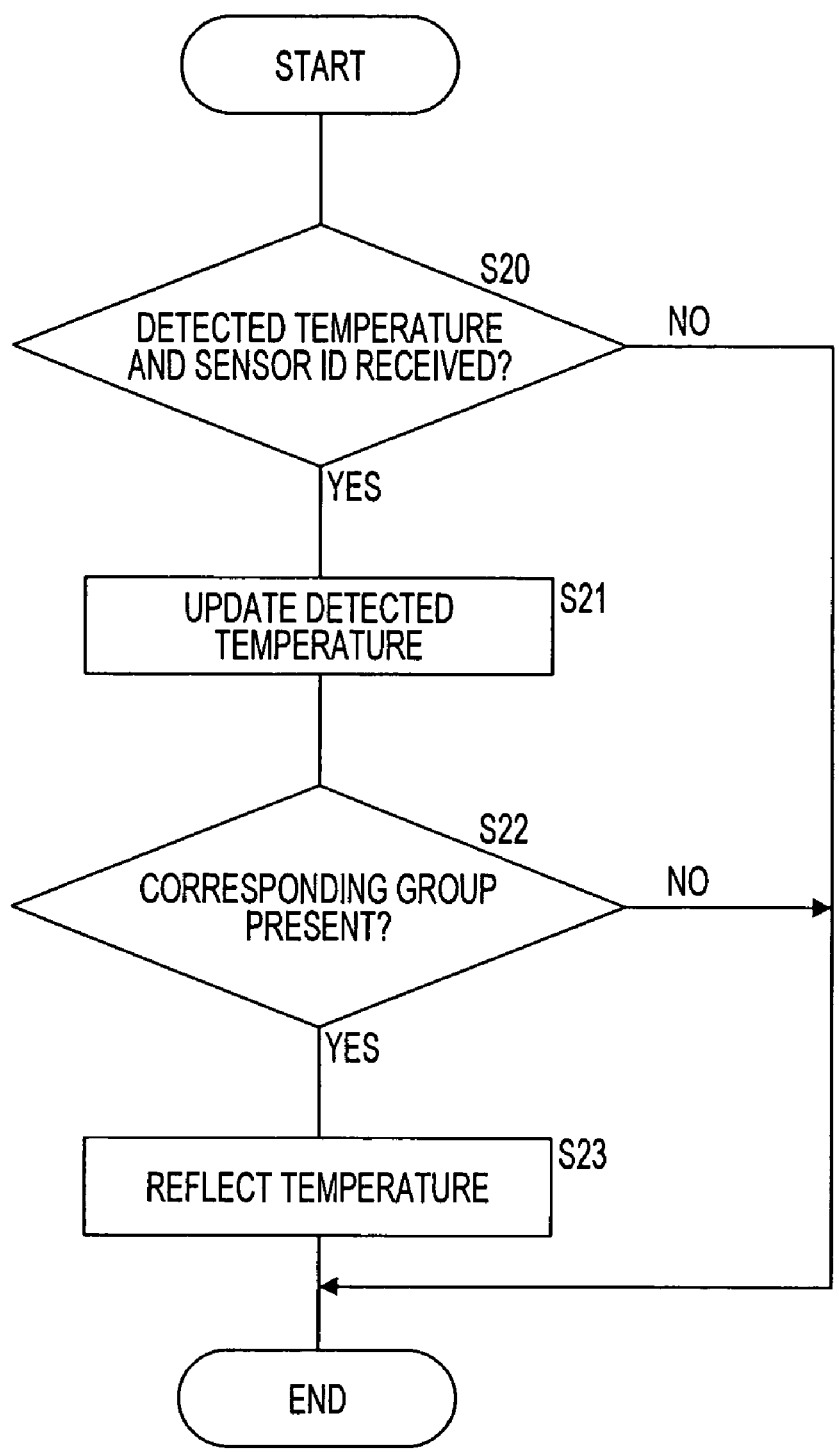
FIG. 7 is a flowchart illustrating a reception process of the server receiving a detected temperature.

FIG. 7 is a flowchart of a process of the server 10 performed when the server 10 receives the detected temperature.

The sensor information receiver 108 determines whether the sensor ID and the detected temperature have been received from the temperature sensor 3 (S20). If the sensor ID and the detected temperature have not been received (no branch from S20), the server 10 ends the process. If the sensor ID and the detected temperature have been received (yes branch from S20), the tag information storage unit 105 references the sensor information storage unit 109 and updates the temperature detected by the temperature sensor 3 (S21). Furthermore, the product management unit 110 references the production information storage unit 111, and updates the temperature corresponding to the tag ID of the wireless tag 2 having the temperature sensor 3, for example, to the state illustrated in FIG. 4A.

The product management unit 110 determines whether any group corresponding to the received sensor ID is present (S22). In this case, the product management unit 110 determines whether the grouping table storing the received sensor ID is stored on the group storage unit 107. If there is no corresponding table (no branch from S22), the server 10 ends the process. If a corresponding table is stored (yes branch from S22), the product management unit 110 causes the temperature of the product set in the group to reflect the detected temperature of the temperature sensor 3 (S23). Referring to FIG. 4B, the CPU 11 causes the products A, B, C, and D to reflect the detected temperature of the temperature sensor 3 attached to the product E. In this way, the products A, B, C, D, and E set in the same group have the same temperature.

As described above, the first embodiment is free from attaching the temperature sensors 3 to all the products being conveyed, and quality of the products is monitored without monitoring the temperatures of all the products being conveyed. Cost increase in the monitoring and management of the products is controlled. It is sufficient if the temperature sensor 3 is attached to any one of the products A, B, C, D, and E in the conveyance block. Since it is not necessary to peg the temperature sensor 3 in a rigid fashion, the management of the products is not complicated.

In accordance with the first embodiment, the reader gate 20 is installed at the conveyance port 92. The present embodiment is not limited to this arrangement. The reader gate 20 may be installed in any other location so that a group is set up in the middle of conveyance. The grouping of the products may be set at any appropriate timing. The conveyance block includes the five products A, B, C, D, and E. The number of products is not limited to five. The product having the temperature sensor 3 mounted thereon is not limited to the product E. The server 10 and the reader gate 20 are two different physical units. Alternatively, the server 10 and the reader gate 20 may be integrated into a single physical unit. For example, the function of the server 10 may be integrated into the reader gate 20. The server 10 may be implemented by a general-purpose personal computer. In accordance with the first embodiment, the product to be conveyed is fresh food. The product may be any product, the temperature of which needs to be monitored. For example, the product may be frozen food. The product may be an electronic component. In place of the temperature sensor 3, a horizon sensor, an acceleration sensor or the like may be used to monitor the transportation status.

A product management system of a second embodiment is described below. The second embodiment is different from the first embodiment in that temperature sensors are attached to a plurality of products in a conveyance block. The difference is described below. Elements identical to those in the first embodiment are designated with the same reference numerals and the discussion thereof is omitted here. A server 80 in the second embodiment is a product management apparatus.

Figure 8:
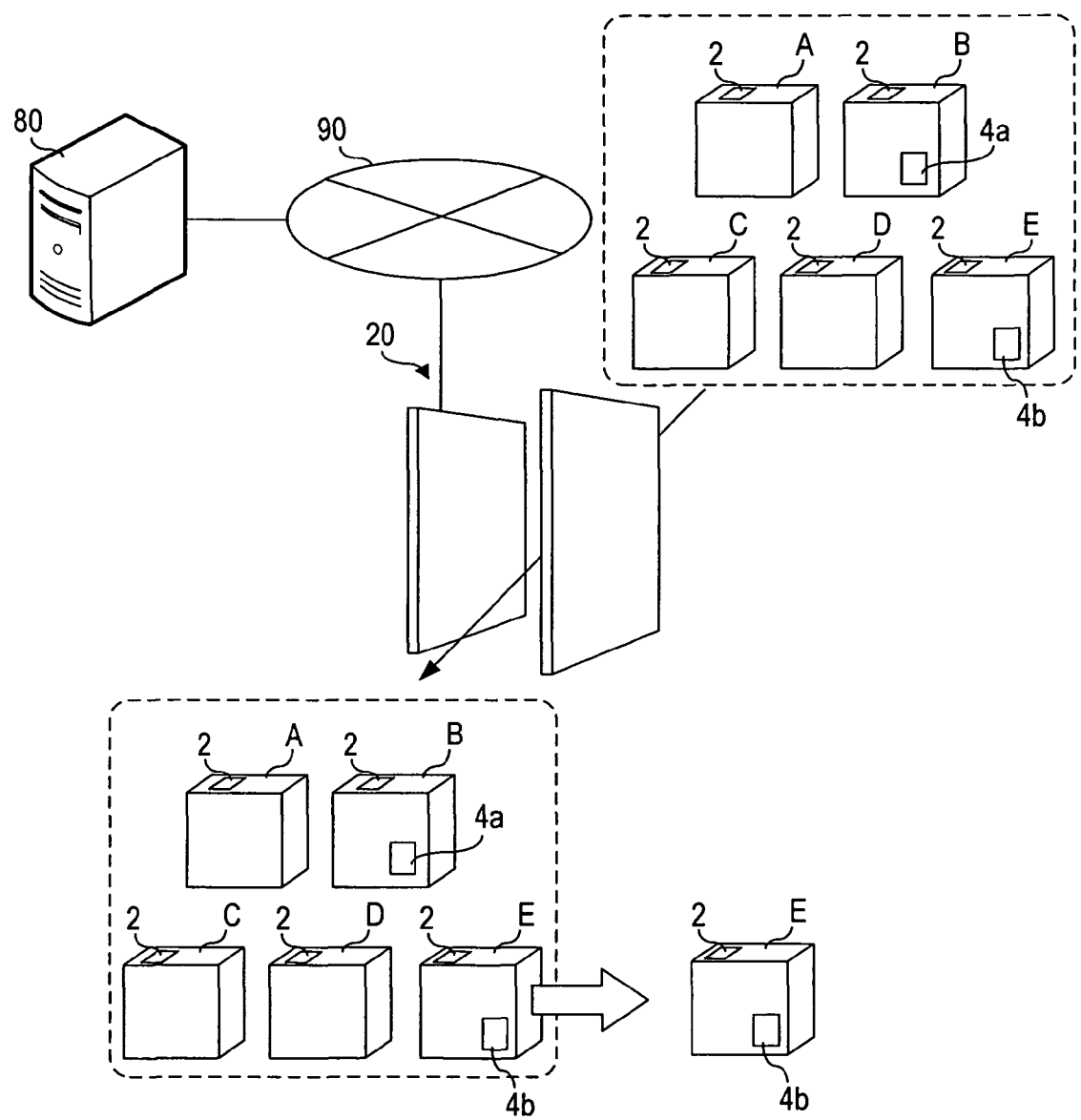
FIG. 8 diagrammatically illustrates a product management system of a second embodiment.

FIG. 8 diagrammatically illustrates a product management system of the second embodiment. In accordance with the second embodiment, products A, B, C, D, and E are set in the same group and temperature sensors 4a and 4b are respectively attached to products B and E. A reader gate 20 is identical the counterpart in the first embodiment. FIG. 8 illustrates the state in which only the product E is separated after the products A, B, C, D, and E in the conveyance block pass through the reader gate 20.

The server 80 receives periodically the detected temperatures from the temperature sensors 4a and 4b. If the detected temperatures of the temperature sensors 4a and 4b fail to be equal to each other, the server 80 determines that one of the products having the temperature sensors 4a and 4b comes off the conveyance block. What is meant by the detected temperatures of the temperature sensors 4a and 4b failing to be equal to each other is that a difference equal to or larger than a specific value is present between the temperatures. For example, the server 80 may receive detected temperatures of "5° C." from the temperature sensors 4a and 4b at a given time. The server 80 may later receive a detected temperature of "5° C." from the temperature sensor 4a and a detected temperature of "15° C." from the temperature sensor 4b. In such a case, the server 80 determines that the product E having the temperature sensor 4b attached thereto is spaced apart from the conveyance block. The server 80 may alarm a person in charge or other person through a monitor, a loudspeaker, or the like.

The server 80 sets the temperature sensor 4a as a main sensor and the temperature sensor 4b as a sub-sensor. Upon receiving the detected temperatures from the temperature sensors 4a and 4b, the server 80 causes the other products A, C, D, and E within the same group to reflect the detected temperature of the temperature sensor 4a as the main sensor.

If the temperature sensor 4a is in trouble, the server 80 causes the remaining products A, B, C, and D to reflect the detected temperature of the temperature sensor 4b.

Alternatively, the server 80 may calculate the mean value of the temperatures of the temperature sensors 4a and 4b and sets the mean temperature as the temperature for the products A, B, C, D, and E of the group. If the detected temperature of the temperature sensor 4a is "5° C.," and the detected temperature of the temperature sensor 4b is "6° C.," the server 80 may set the temperature of the products A, B, C, D, and E to "5.5° C."

A variety of data tables stored on the high-volume storage device 14 in the server 80 are described below.

FIG. 9A illustrates a sensor mapping table. The sensor mapping table stores the tag IDs of the wireless tags 2 and the sensor IDs of the temperature sensors 4a and 4b in a mapped state thereof. In accordance with the second embodiment, the sensor IDs of the temperature sensors 4a and 4b respectively attached to the products B and E are "X2" and "X3," respectively. The temperature sensors 4a and 4b are respectively set as a main sensor and a sub-sensor.

FIG. 9B illustrates a grouping table. The grouping table stores the sensor IDs of the temperature sensors 4a and 4b and the tag IDs of the wireless tags 2 respectively attached to a plurality of products having passed through the reader gate 20 at substantially the same time. The grouping table may further register G-ID, time and date of generation on which the table was generated, and the expiration date of the table.

Figure 10:
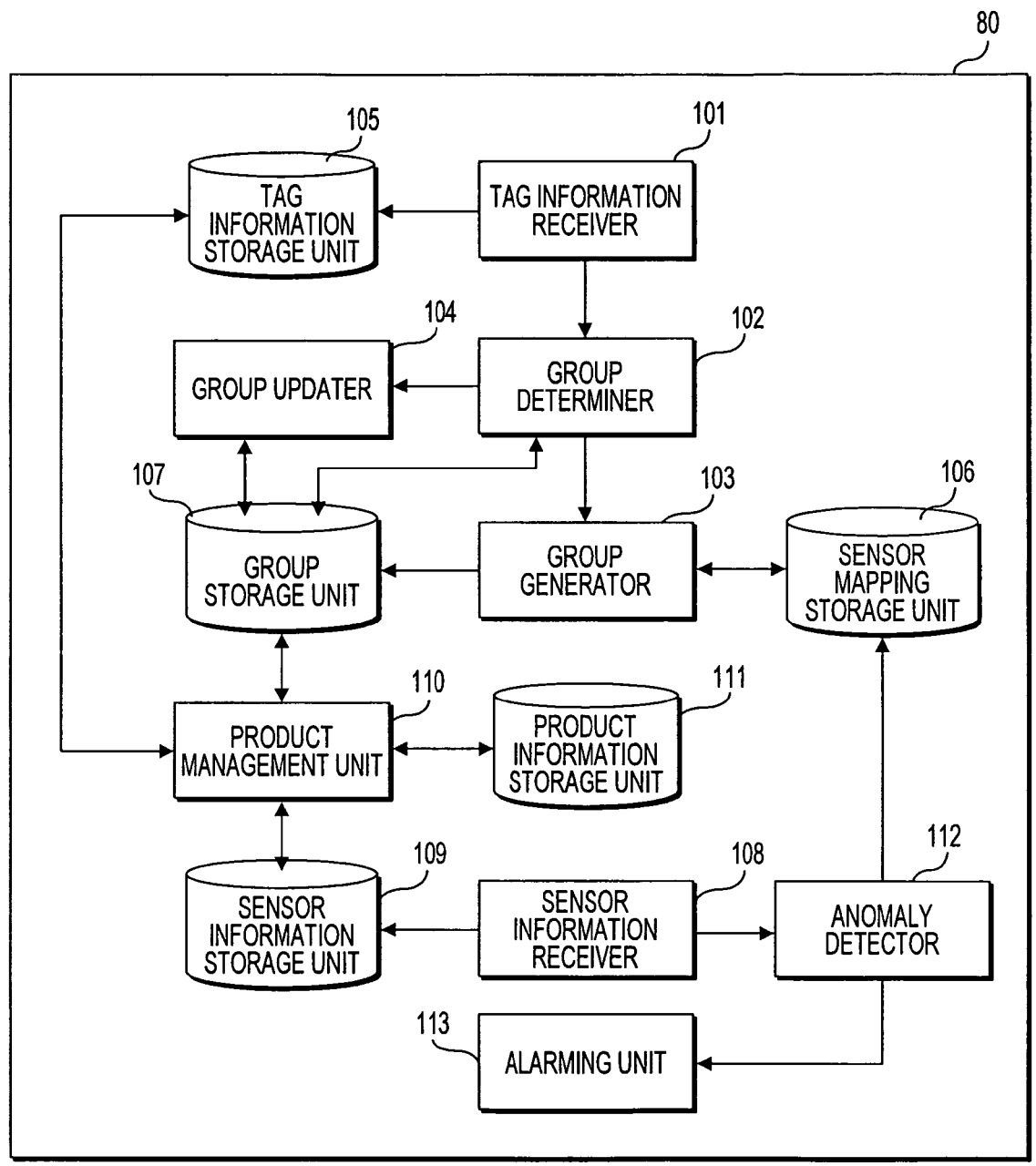
FIG. 10 is a functional block diagram illustrating a function of a server of the second embodiment.

A process of the server 80 in the above-described product management system is described below. FIG. 10 is a functional block diagram of the server 80 of the second embodiment. The server 80 of the second embodiment includes an anomaly detector 112 and an alarming unit 113, etc., in addition to the processors of the server 10 of the first embodiment.

As the server 10, the server 80 includes, as hardware elements, the central processing unit (CPU) 11, the read-only memory (ROM) 12, the random-access memory (RAM) 13, the high-volume storage device 14, the input/output unit 15, the communication unit 16, etc. The CPU 11 reads a program pre-stored on the ROM 12, the high-volume storage device 14, or the like onto the RAM 13 as appropriate for execution. The CPU 11 controls operation of each of the above-described hardware elements. The ROM 12 pre-stores a program 12a for causing the server 10 to operate as a product management apparatus.

In response to the temperature received by the sensor information receiver 108, the anomaly detector 112 detects an anomaly generated in the temperature sensor 4a. For example, the anomaly detector 112 detects, as an anomaly, that the detected temperature received by the sensor information receiver 108 is different from the previously detected temperature by a specific value or that the sensor information receiver 108 has not received detected temperature for a specific period of time. The anomaly detector 112 having detected an anomaly updates the sensor mapping table, and sets the temperature sensor 4b previously set as the main sensor to be the sub-sensor. The group generator 103 changes the setting on the grouping table to switch between the main sensor and the sub-sensor.

The anomaly detector 112 also determines whether a difference between the temperatures detected by the temperature sensors 4a and 4b is equal to or larger than a specific value. If the difference is equal to or larger than the specific value, the anomaly detector 112 determines that one of the products B and E having the temperature sensors 4a and 4b attached respectively thereto is spaced apart from the conveyance block. In this case, the anomaly detector 112 so notifies the alarming unit 113, and the alarming unit 113 alarms a person in charge through a monitor, a loudspeaker, or the like.

Figure 11:
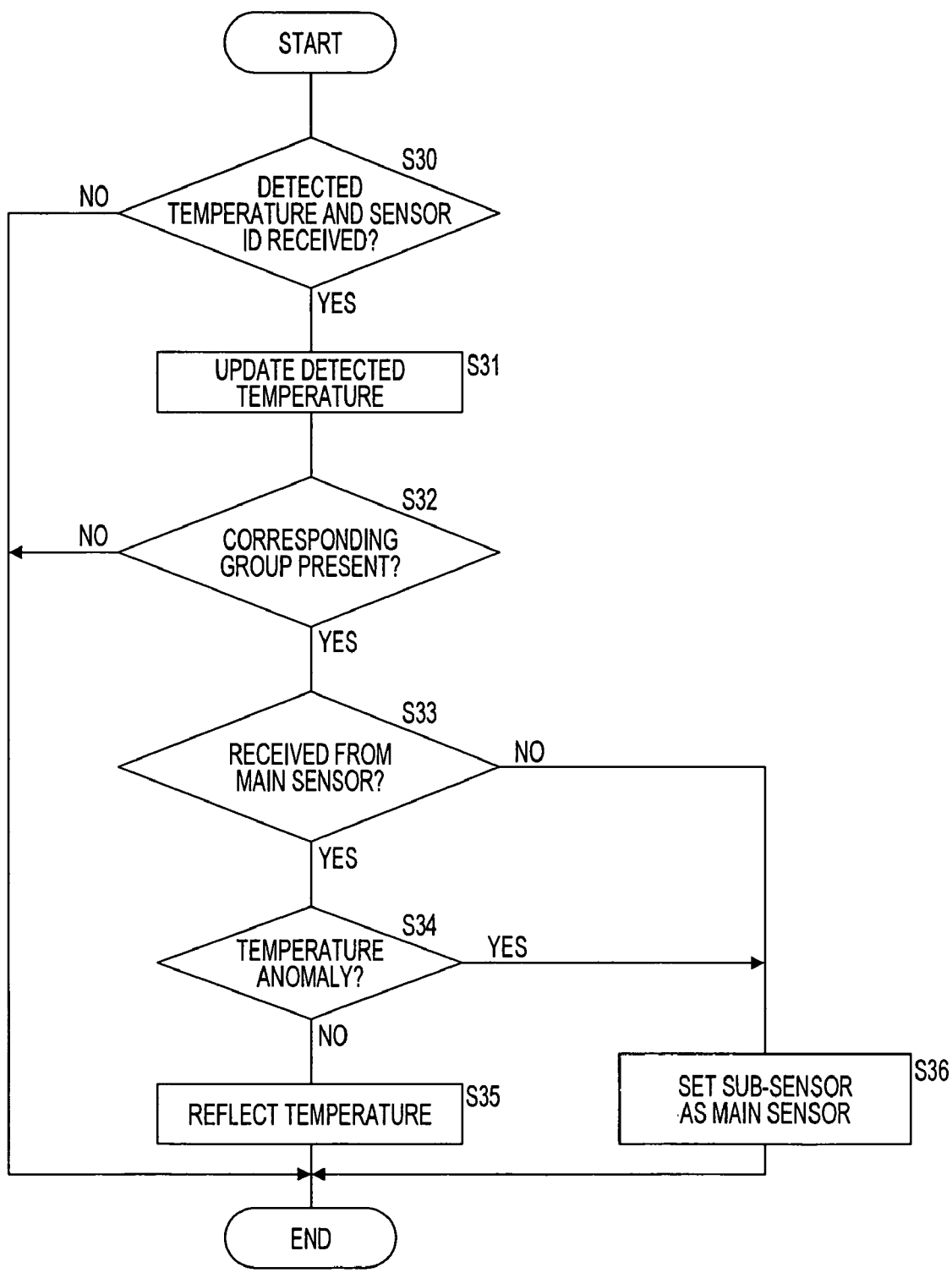
FIG. 11 is a flowchart illustrating a reception process of the server receiving the detected temperature.

The process of the server 80 in the above-described product management system is described below. FIG. 11 is a flowchart of a process of the server 80 performed when the server 80 receives the detected temperature. The process of the server 80 for receiving the tag ID remains unchanged from the corresponding process in the first embodiment.

The sensor information receiver 108 determines whether the sensor information receiver 108 has received the sensor IDs and the detected temperatures of the temperature sensors 4a and 4b (S30). If the sensor IDs and the detected temperatures have not been received (no branch from S30), the server 80 ends the process. If the sensor IDs and the detected temperatures have been received (yes branch from S30), the sensor information receiver 108 updates the detected temperatures of the temperature sensors 4a and 4b on the sensor mapping table (S31). The product management unit 110 updates the product information management table stored on the production information storage unit 111.

The group determiner 102 determines whether a group corresponding to the received sensor ID is present (S32). More specifically, the group determiner 102 determines whether the grouping table listing the received sensor ID is stored on the group storage unit 107. If no corresponding table is stored on the group storage unit 107 (no branch from S32), the server 80 ends the process. If a corresponding table is stored on the group storage unit 107 (yes branch from S32), the anomaly detector 112 determines whether the received detected temperature is the temperature received from the temperature sensor 4a set as the main sensor (S33).

If the temperature is received from the temperature sensor 4a (yes branch from S33), the anomaly detector 112 determines whether the detected temperature of the temperature sensor 4a is in an anomaly range (S34). If the detected temperature is not in an anomaly (no branch from S34), the product management unit 110 causes the temperature of each product within the same group to reflect the received temperature (S35). In this way, the products A, B, C, D, and E have the same temperature. The server 80 then ends the process.

If the detected temperature of the temperature sensor 4a is within the anomaly range (yes branch from S34), the anomaly detector 112 determines that the temperature sensor 4a is likely to be in trouble. The anomaly detector 112 then sets the temperature sensor 4b working as the sub-sensor to be working as the main sensor (S36). The CPU 11 then ends the process. If the detected temperature of the temperature sensor 4b is in the anomaly range, the anomaly detector 112 may alarm a person in charge to an temperature anomaly.

If it is determined in S33 that the detected temperature is not the temperature from the temperature sensor 4a serving as the main sensor (no branch from S33), the anomaly detector 112 determines that the detected temperature is the temperature received from the temperature sensor 4b serving as the sub-sensor. The anomaly detector 112 then determines that no detected temperature is received from the temperature sensor 4a with the temperature sensor 4a in trouble. The anomaly detector 112 sets the temperature sensor 4b to be the main sensor (S36). The anomaly detector 112 then ends the process. With a backup sensor arranged in this way, the temperature monitoring process of the product may thus continue to operate even if one temperature sensor malfunctions in this way.

Figure 12:
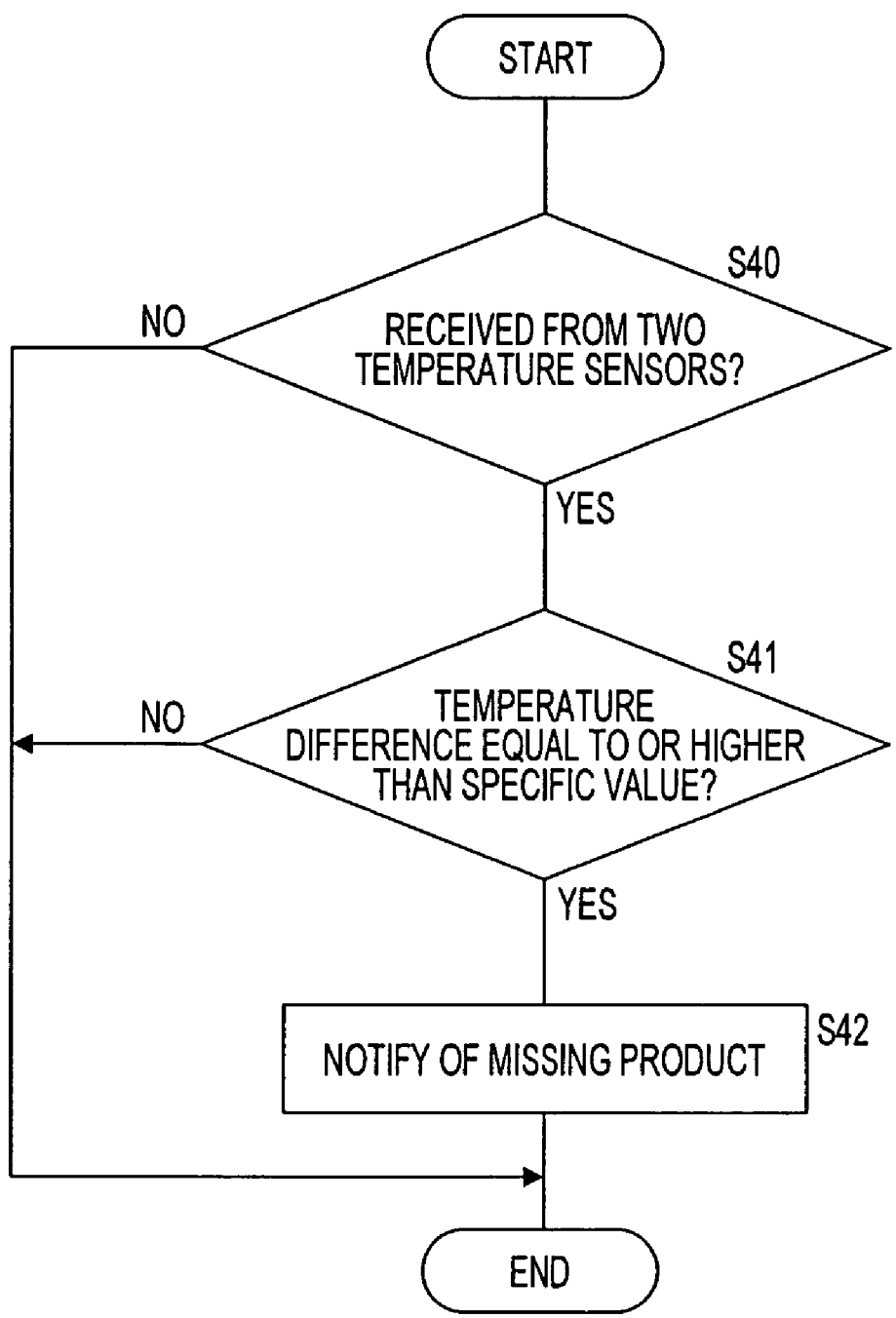
FIG. 12 is a flowchart illustrating a detection process of detecting a missing product.

FIG. 12 is a flowchart of a process of detecting a missing product.

The anomaly detector 112 determines whether the detected temperature has been received from each of the temperature sensors 4a and 4b (S40). If no detected temperatures have been received (no branch from S40), the anomaly detector 112 ends the process. If the detected temperatures have been received (yes branch from S40), the anomaly detector 112 determines whether a difference between the detected temperatures of the temperature sensors 4a and 4b is a specific value or larger (S41). If the difference is larger than the specific value (no branch from S41), the anomaly detector 112 ends the process. If the difference is equal to or larger than the specific value (yes branch from S41), the anomaly detector 112 determines that a product has come off. The alarming unit 113 then so notifies a person in charge or any other person (S42). The server 80 then ends the process.

In addition to the advantages of the first embodiment, the second embodiment provides the following advantages. Even if one temperature sensor malfunctions, the other temperature sensor serves as a backup to continue the temperature monitoring process of the product. Also in accordance with the second embodiment, the product management apparatus may detect one of the products having the temperature sensors 4a and 4b respectively attached thereto coming off the conveyance block. The product management apparatus may thus detect any product removed from the conveyance block in an intentional mistake or a human error.

A product management system of a third embodiment is described below.

Figure 13:
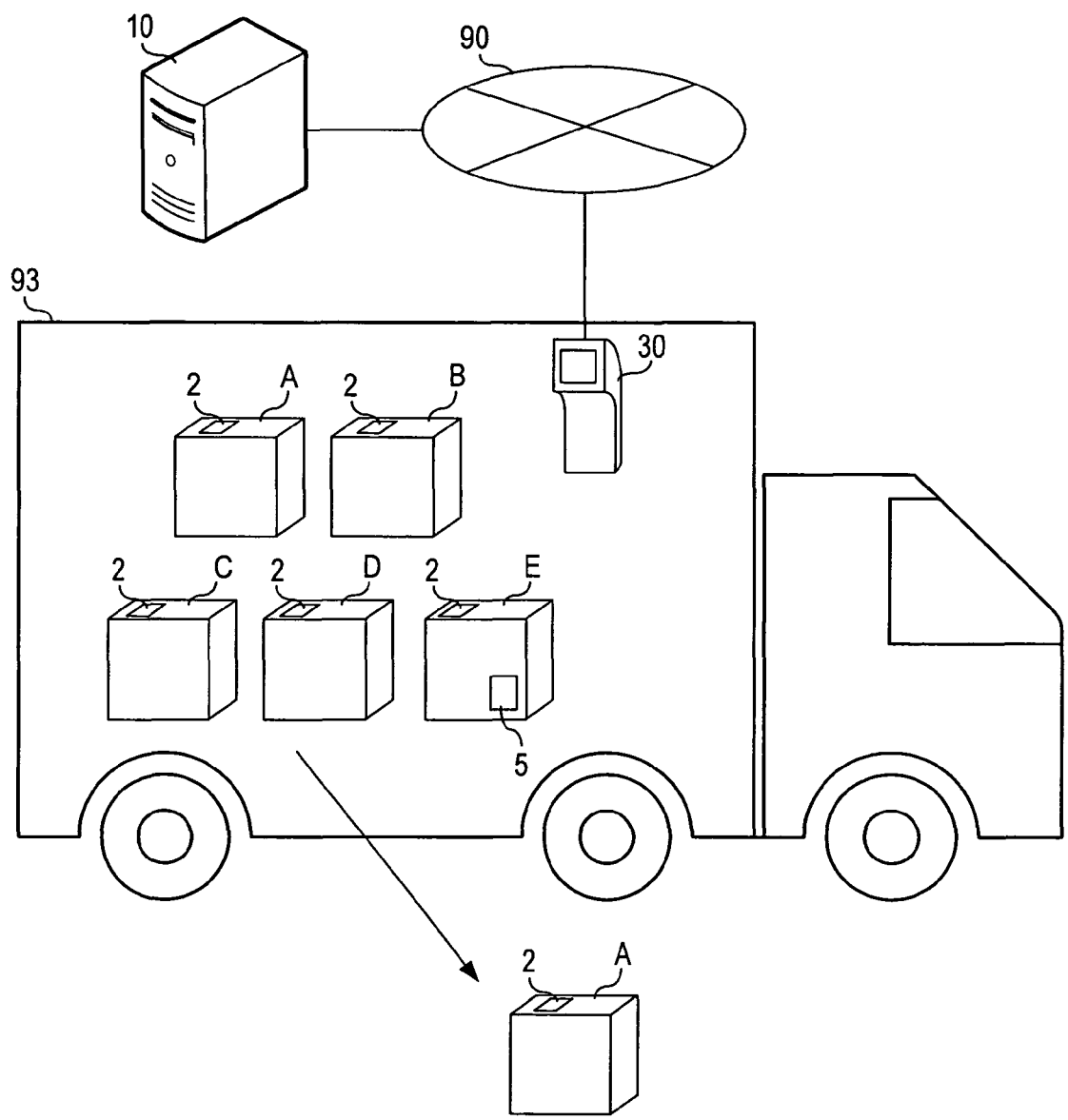
FIG. 13 diagrammatically illustrates a product management system of a third embodiment.

FIG. 13 diagrammatically illustrates the product management system of the third embodiment. The product management system of the third embodiment manages a delivery status of products. The product management system of the third embodiment monitors the position of a product when the product is transported on a truck 93 or the like. In accordance with the third embodiment, products A, B, C, D, and E are transported and then unloaded from the truck 93.

The products A, B, C, D, and E have the respective wireless tags 2 in the same manner as in the first embodiment. A position sensor 5 is attached to the product E. The position sensor 5 periodically acquires position information of the product E to which the position sensor 5 is attached. The position sensor 5 may be a global positioning system (GPS) sensor, or a sensor operating based on traffic information. The position sensor 5 may be attached to one or each of the products transported on the truck 93. The products handled in accordance with the third embodiment may be books, furniture, home electronics, or the like to be transported.

The product management system of the third embodiment includes a server 10, and a mobile reader device 30 connected to the server 10 via a communication network 90. The mobile reader device 30 reads the tag ID from the wireless tag 2. The mobile reader device 30 has the same function as that of the reader gate 20 of the first embodiment. The discussion of the mobile reader device 30 is thus omitted here.

The server 10 receives via the communication network 90 the position information acquired by the position sensor 5. The communication network 90 of the third embodiment may be one of a cellular phone network and the Internet. If the mobile reader device 30 reads the tag IDs from the products A, B, C, D, and E within a specific period of time, the server 10 sets the products A, B, C, D, and E in one group. The specific period of time is 10 minutes, for example. The server 10 causes the other products A, B, C, and D within the same group to reflect the position information of the product E acquired by the position sensor 5. In accordance with the third embodiment, it is not necessary to attach the position sensor 5 for position monitoring to all the products transported on the truck 93.

When the product A is unloaded from the truck 93, the mobile reader device 30 reads the tag ID from the product A. The server 10 deletes the tag ID "A" of the product A from the group. The server 10 then does not cause the product A to reflect the position information.

The structure of the server 10 and the mobile reader device 30 and the function of the server 10 remain unchanged from those of the counterparts in the first embodiment, and the discussion thereof is omitted here.

In accordance with the third embodiment as previously discussed, it is not necessary to attach the position sensor 5 to all the products transported. In accordance with the third embodiment, the delivery status of the product is monitored by monitoring the position of the product. Cost increase in the monitoring and management of the product is controlled. It is sufficient if the position sensor 5 is attached to any one of the products A, B, C, D, and E in the conveyance block. Since the third embodiment is free from the need of attaching the position sensor 5 statically to the products, the management of the product is not complicated.

The product management system of a fourth embodiment is described below. In accordance with the first embodiment, the communication unit 3a in the temperature sensor 3 transmits information to the server 10 via the network. In contrast, the temperature detected by a temperature sensor is read by a dedicated reader device, which in turn transmits the temperature information to a server in the fourth embodiment. In other words, the temperature is automatically transmitted to the server 10 in the first embodiment while the temperature is manually transmitted in the fourth embodiment. The difference between the fourth embodiment and the first embodiment is described below.

Figure 14:
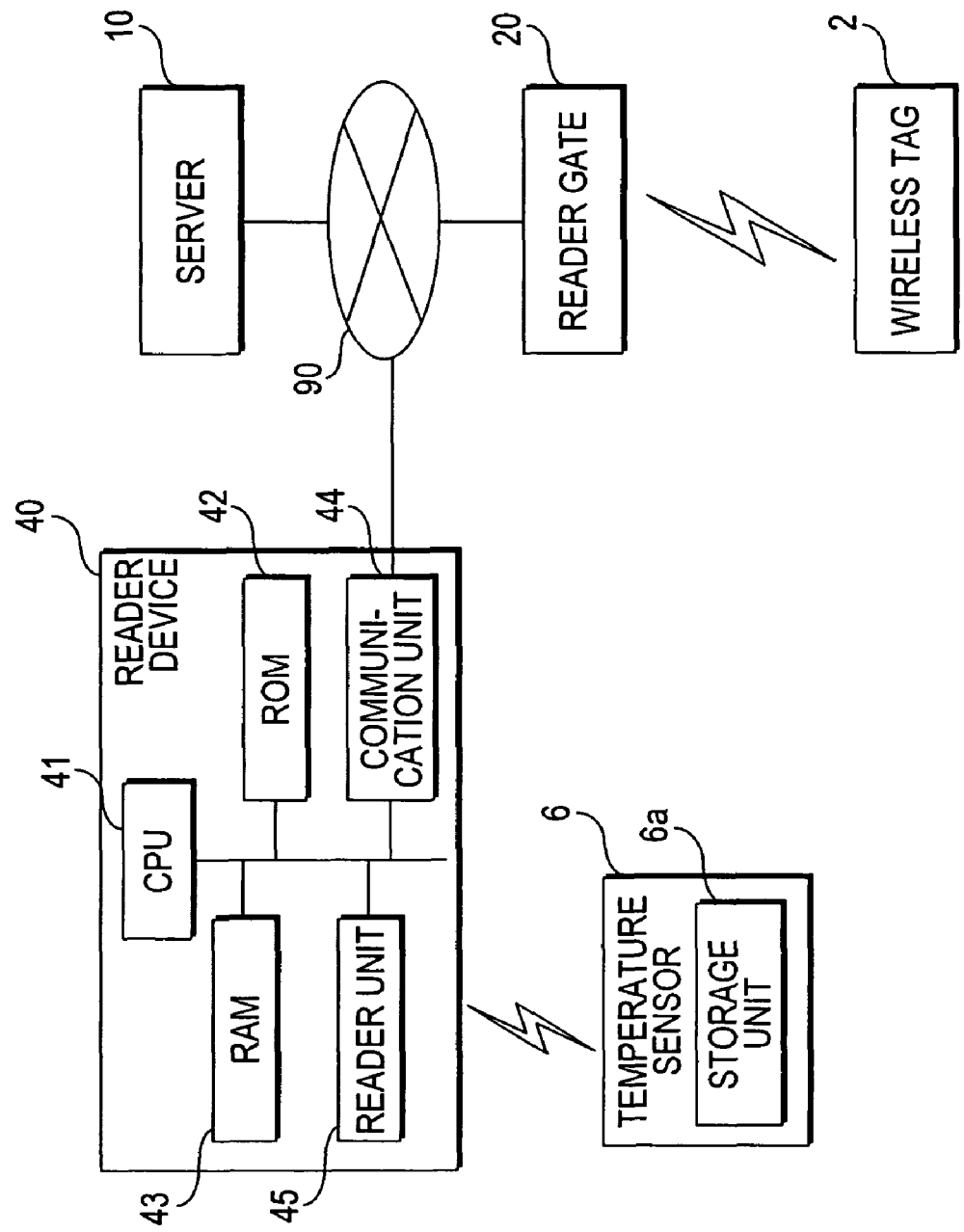
FIG. 14 is a block diagram illustrating a structure of a product management system of a fourth embodiment.

FIG. 14 is a block diagram illustrating a structure of the product management system of the fourth embodiment. In accordance with the fourth embodiment, the temperature sensor 3 is attached to each of the products A, B, C, D, and E. A temperature sensor 6 is attached to the product E. The temperature sensor 6 includes a storage unit 6a. The storage unit 6a stores detected temperatures.

The product management system includes the server 10 and the reader gate 20, discussed with reference to the first embodiment, and a reader device 40 reading the detected temperature stored on the storage unit 6a of the temperature sensor 6. The reader device 40 includes a CPU 41, a ROM 42, a RAM 43, a communication unit 44, a reader unit 45, etc. The CPU 41 executes a program stored on the ROM 42 and stores data temporarily on the RAM 43. The communication unit 44 communicates data with the server 10 via the communication network 90. In a contact fashion or non-contact fashion, the reader unit 45 reads the detected temperature stored on the temperature sensor 6. The detected temperature is transmitted to the server 10 at the same timing as read by the reader unit 45.

A product information management table is illustrated in FIGS. 15A-15C. FIGS. 15A-15C illustrate how the product information management table is transitioned in accordance with the progress of the transportation of the products A, B, C, D, and E.

FIG. 15A illustrates the product information management table before the server 10 receives the detected temperature from the reader device 40. For example, as the product A, "in transportation" is stored at the transportation status cell. With no temperature sensor 3 attached, the label "N/A" is stored at the temperature cell. The temperature sensor 6 is attached to the product E. Since the server 10 has received no detected temperature, the label "N/A" is stored at the temperature cell of the product E.

FIG. 15B illustrates the product information management table after the detected temperature has been received from the reader device 40. In accordance with the grouping table, the server 10 updates the product information management table. The products A, B, C, and D having no temperature sensor 3 attached thereto are included in the same group as the product E. The temperature of the products A, B, C, and D having no temperature sensor 3 attached thereto reflects "8° C." If the temperature of the product E changes to "5° C.," the temperature of the other products A, B, C, and D is also modifies to "5° C."

FIG. 15C illustrates the product information management table with the products A and B excluded from the set group. For example, when the products A and B are conveyed out, the server 10 receives the tag IDs of the products A and B. If the products A and B are still listed in the group, the server 10 excludes the products A and B from the group. As a result, the products A and B do not reflect any more the temperature of the product E set in the same group. The temperature cells of the products A and B in the product information management table are changed to "N/A."

The server 10 performs the grouping process, and the detected temperature monitoring process of the product in the same manner as described with reference to the first embodiment, and the discussion thereof is omitted here.

In addition to the advantages of the first embodiment, the fourth embodiment provides the following advantages as described above. The temperature of the product is updated as necessary. An amount of information to be stored is small in comparison with the case in which the temperature is periodically updated. Since the detected temperature is stored on the temperature sensor 6, the server 10 may retrieve the detected temperature after recovery from a fault. For example, a fault may occur in the network, and the server 10 may not monitor the temperature. In accordance with the fourth embodiment, the server 10 may still retrieve the detected temperature.

A fifth embodiment is described below. In accordance with the first embodiment, the wireless tag 2 and the position sensor 5 attached to the product E are separate elements. In accordance with the fifth embodiment, a wireless tag attached to the product E has a function of detecting temperature. The difference between the fifth embodiment and the first embodiment is described below.

Figure 16:
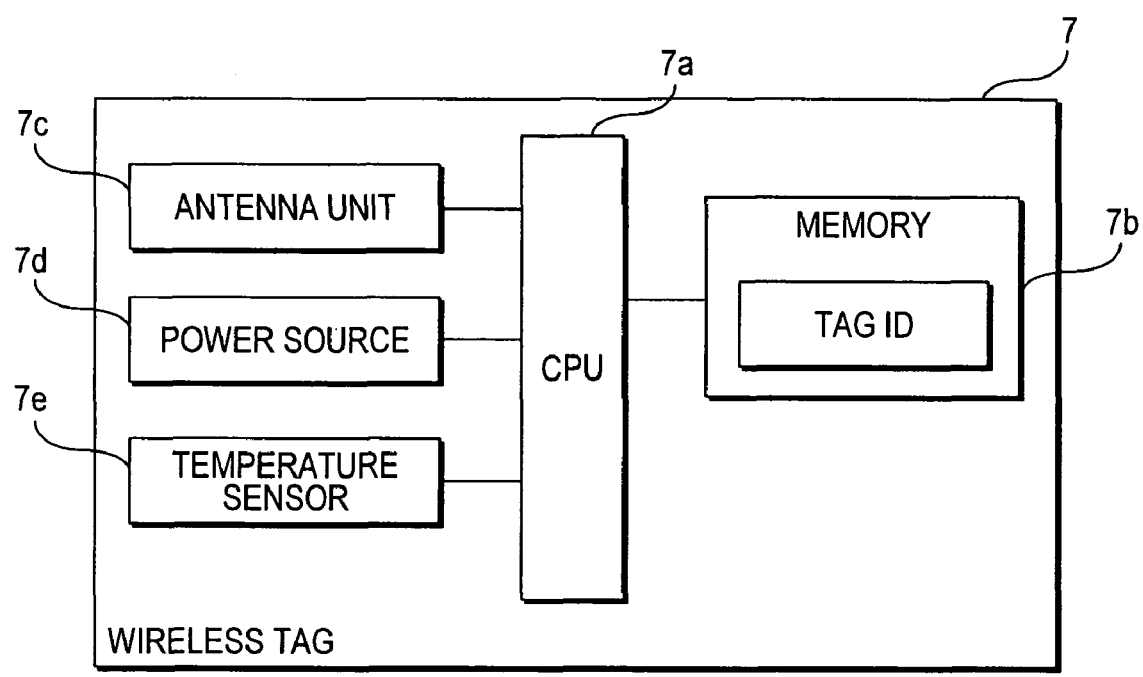
FIG. 16 is a block diagram illustrating a structure of a wireless tag having a temperature detection function.

FIG. 16 is a block diagram of a wireless tag 7 having also a temperature detection function. The wireless tag 7 of the fifth embodiment includes a CPU 7a, a memory 7b, a antenna unit 7c, a power source 7d, a temperature sensor 7e, etc. The temperature detected by the temperature sensor 7e is stored on the memory 7b. The wireless tag 7 transmits from the reader gate 20 the detected temperature from the memory 7b together with the tag ID. The wireless tag 2 is attached to each of the products A, B, C, and D in the same manner as in the first embodiment. The wireless tag 7 may be attached to any one of the products A, B, C, D, and E.

The reader gate 20 reads the tag IDs from the wireless tag 2 and the wireless tag 7 when the products A, B, C, D, and E pass through the reader gate 20. The reader gate 20 further reads the detected temperature from the wireless tag 7. The reader gate 20 transmits to the server 10 the read tag ID and detected temperature.

The server 10 receives the tag ID and detected temperature from the reader gate 20. The server 10 receives the detected temperature together with the tag ID, and is thus free from pre-storing the sensor mapping table illustrated in FIG. 3B. The server 10 updates the temperature of the product each time the reader gate 20 or another reader device (not illustrated) reads the tag ID from the wireless tag 2 and the wireless tag 7. The server 10 performs the grouping process in the same manner as in the first embodiment, and the discussion thereof is omitted.

In accordance with the fifth embodiment as described above, the use of the wireless tag 7 having the temperature detection function eliminates the need for a separate temperature sensor. The server 10 needs no sensor mapping table. The user of the server 10 of the embodiment is free from mapping the wireless tag to the temperature sensor.

Various embodiments have been specifically discussed. The embodiments may be modified in structure and operation, and are not limited to those described above.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal. The media described above may be non-transitory media.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A product management apparatus, comprising:
a tag information receiver that receives first tag information identifying a first wireless tag attached to a first product, and second tag information identifying a second wireless tag attached to a second product;
a group determiner that determines whether a sensor related to the received first tag information is present;
a group generator that generates group information including the first tag information and the second tag information when the group determiner determines that the sensor is present and when a difference between the time of reception of the first tag information by the tag information receiver and the time of reception of the second tag information by the tag information receiver falls within a specific range;
a sensor information receiver that retrieves environment information of an environment surrounding the sensor detected by the sensor; and
a product management unit that associates the retrieved environment information with the first tag information and the second tag information, included in the group information.

2. The product management apparatus according to claim 1, wherein the tag information receiver receives the first tag information and the second tag information from a reader device that reads information recorded on the first wireless tag and the second wireless tag.

3. The product management apparatus according to claim 1, further comprising:
a group updater that deletes the second tag information from the group information when the tag information receiver receives the second tag information included in the group information while not receiving the first tag information, and
wherein, on the basis of another group information updated, the product management unit associates other environment information detected by the sensor with the first tag information.

4. The product management apparatus according to claim 1, further comprising:
a storage unit that stores identification information identifying the sensor and the first tag information related to the sensor mapped thereto,
wherein the group determiner references the storage unit to determine whether the sensor is present.

5. The product management apparatus according to claim 1, wherein the group generator generates the group information including third tag information identifying a third wireless tag attached to a third product when the tag information receiver receives the third tag information,
wherein the sensor information receiver retrieves another environment information from another sensor related to the third tag information, and
wherein the product management unit associates the environment information retrieved from the sensor or the another environment information retrieved from the another sensor with the first tag information, the second tag information, and the third tag information, included in the group information.

6. The product management apparatus according to claim 5, wherein, on the basis of information that the sensor is set as a main sensor, the product management unit associates the environment information retrieved from the sensor with the first tag information, the second tag information, and the third tag information, included in the group information.

7. The product management apparatus according to claim 6, wherein the product management unit associates the another environment information retrieved from the another sensor to the first tag information, the second tag information, and the third tag information, included in the group information when the sensor information receiver fails to receive the environment information from the sensor that has been set as the main sensor.

8. The product management apparatus according to claim 5, further comprising:
an anomaly detector that compares the retrieved environment information with the another environment information and detects an anomaly in one of the first product and the third product based on a comparison results.

9. The product management apparatus according to claim 8, wherein the anomaly detector detects, as the anomaly, that an environment with the first wireless tag present therewithin is different from an environment with the third wireless tag therewithin when the environment information is different from the another environment information by a specific range or more.

10. The product management apparatus according to claim 1, wherein the sensor comprises a sensor detecting temperature, and wherein the environment information indicates a temperature of a surrounding environment of the sensor.

11. The product management apparatus according to claim 1, wherein the group generator generates the group information further including third tag information identifying a third wireless tag attached to a third product,
   wherein the sensor information receiver retrieves the other environment information of another sensor related to the third tag information, and
   wherein the product management unit generates new environment information based on the environment information retrieved from the sensor and the another environment information retrieved from the another sensor, and associates the new environment information with the first tag information, the second tag information, and the third tag information, included in the group information.

12. The product management apparatus according to claim 1, wherein the sensor comprises a sensor detecting position, and wherein the environment information indicates a position where the sensor is present.

13. A product management method executed by a computer, the product management method comprising:
   receiving, in a first reception step, first tag information identifying a first wireless tag attached to a first product;
   receiving, in a second reception step, second tag information identifying a second wireless tag attached to a second product;
   determining whether a sensor related to the received first tag information is present;
   generating group information, including the first tag information and the second tag information, when the sensor is present and when a difference between the time of reception of the first tag information and the time of reception of the second tag information falls within a specific range;
   retrieving environment information of a surrounding environment of the sensor detected by the sensor; and
   associating the retrieved environment information with the first tag information and the second tag information, included in the group information.

14. The product management method according to claim 13, wherein the first reception step and the second reception step respectively comprise receiving the first tag information and the second tag information from a reader device that reads information recorded on the first wireless tag and the second wireless tag.

15. The product management method according to claim 13, further comprising:
   deleting the second tag information from the group information when the second tag information included in the group information is received again, and
   associating the other environment information detected by the sensor with the first tag information based on the updated other information.

16. The product management method according to claim 13, wherein the sensor detects temperature and wherein the environment information indicates a temperature of a surrounding environment of the sensor.

17. A non-transitory storage medium storing a product management program that causes a computer to execute:
   receiving, in a first reception step, first tag information identifying a first wireless tag attached to a first product;
   receiving, in a second reception step, second tag information identifying a second wireless tag attached to a second product;
   determining whether a sensor related to the received first tag information is present;
   generating group information, including the first tag information and the second tag information, when the sensor is present and when a difference between the time of reception of the first tag information and the time of reception of the second tag information falls within a specific range;
   retrieving environment information of a surrounding environment of the sensor detected by the sensor; and
   associating the retrieved environment information with the first tag information and the second tag information, included in the group information.

18. The non-transitory storage medium according to claim 17, wherein the first reception step and the second reception step respectively comprise receiving the first tag information and the second tag information from a reader device that reads information recorded on the first wireless tag and the second wireless tag.

19. The non-transitory storage medium according to claim 17, further comprising:
   deleting the second tag information from the group information for updating if the second tag information included in the group information is received again, and
   associating the other environment information detected by the sensor with the first tag information based on the updated other information.

20. The non-transitory storage medium according to claim 17, wherein the sensor detects temperature and wherein the environment information indicates a temperature of a surrounding environment of the sensor.

\* \* \* \* \*